US011693829B2

(12) United States Patent
Wu et al.

(10) Patent No.: US 11,693,829 B2
(45) Date of Patent: Jul. 4, 2023

(54) FACILITATING OUTLIER OBJECT DETECTION IN TIERED STORAGE SYSTEMS

(71) Applicant: EMC IP Holding Company LLC, Hopkinton, MA (US)

(72) Inventors: Xin Wu, Shanghai (CN); Jignesh Bhadaliya, Irvine, CA (US); Min Gong, Shanghai (CN); Meng Wang, Shanghai (CN); Minglong Sun, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 261 days.

(21) Appl. No.: 16/728,805

(22) Filed: Dec. 27, 2019

(65) Prior Publication Data

US 2021/0200722 A1 Jul. 1, 2021

(51) Int. Cl.
*G06F 17/00* (2019.01)
*G06F 7/00* (2006.01)
*G06F 16/185* (2019.01)
*G06F 9/445* (2018.01)
*G06F 16/11* (2019.01)

(52) U.S. Cl.
CPC ........ *G06F 16/185* (2019.01); *G06F 9/44505* (2013.01); *G06F 16/122* (2019.01)

(58) Field of Classification Search
CPC ... G06F 16/185; G06F 16/122; G06F 9/44505
USPC ........................................................ 707/829
See application file for complete search history.

(56) References Cited

U.S. PATENT DOCUMENTS

| 2003/0101383 A1* | 5/2003 | Carlson | G06F 16/1724 714/42 |
| 2004/0117727 A1* | 6/2004 | Wada | G06F 1/1694 715/273 |
| 2004/0174798 A1* | 9/2004 | Riguidel | G11B 20/00695 369/111 |
| 2007/0088605 A1* | 4/2007 | Ghate | G06Q 30/0241 705/14.4 |
| 2011/0106846 A1* | 5/2011 | Matsumoto | G06F 16/16 707/769 |
| 2011/0219002 A1* | 9/2011 | Bartram | G06F 18/22 707/738 |

(Continued)

*Primary Examiner* — Pavan Mamillapalli
(74) *Attorney, Agent, or Firm* — Amin, Turocy & Watson, LLP

(57) ABSTRACT

Facilitating outlier object detection in tiered storage systems is provided herein. A system can comprise a processor and a memory that stores executable instructions that, when executed by the processor, facilitate performance of operations. The operations can comprise determining respective parameters associated with objects of a group of objects of a tiered storage system. The respective parameters can comprise at least one of a size, an access percentage, or a cost. The operations also can comprise using the respective parameters associated with the objects of the group of objects as inputs and performing data clustering on the group of objects, resulting in at least one data cluster. Further, the operations can comprise selecting at least one object from the group of objects as at least one outlier object within the tiered storage system based on the at least one data cluster.

20 Claims, 13 Drawing Sheets

(56) References Cited

U.S. PATENT DOCUMENTS

| | | | |
|---|---|---|---|
| 2012/0110259 A1* | 5/2012 | Mills | G06F 13/385 |
| | | | 711/E12.078 |
| 2013/0227714 A1* | 8/2013 | Gula | H04L 63/1408 |
| | | | 726/32 |
| 2014/0258185 A1* | 9/2014 | Sharon | G06N 20/00 |
| | | | 706/12 |
| 2015/0095307 A1* | 4/2015 | Bensberg | G06F 16/278 |
| | | | 707/714 |
| 2018/0150724 A1* | 5/2018 | Brock | G06F 21/563 |
| 2019/0206524 A1* | 7/2019 | Baldwin | G06F 40/169 |

* cited by examiner

100
FACILITATING OUTLIER OBJECT DETECTION IN TIERED STORAGE SYSTEMS

TECHNICAL FIELD

The subject disclosure relates generally to data storage and communications. More specifically, the subject disclosure relates to tiered file systems and related performance of such systems.

BACKGROUND

Tiered storage is a type of data storage environment that can include two or more kinds of storage which can be allocated based on differences in one or more of price, performance, capacity, and function. Tiering is popular in file system implementations. Users of such systems can obtain better performance with limited investment on high speed storage mediums, as compared to non-tiered systems. Generally, users create tiering rules according to workflow (e.g., name) or file access time and/or file modification time of objects (e.g., files, folders). However, such solutions are not necessarily accurate, and, with time moving and usage changing, it is possible that file system performance can become worse for objects staying at, or being moved to, improper tiers.

The above-described context with respect to conventional tiered storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a method that can comprise evaluating, by a system comprising a processor, a first set of parameters associated with a first folder of a tiered storage system. The method also can comprise comparing, by the system, the first set of parameters with other sets of parameters associated with other folders of the tiered storage system other than the first folder. Further, the method can comprise determining, by the system, the first folder is on outlier based on a result of the comparing.

In an example, the first folder can comprise at least one of one or more sub-folders, or one or more files. Further, evaluating the first set of parameters can comprise determining a size of the first folder as a sum total of respective sizes of the at least one of the one or more sub-folders or the one or more files.

In another example, the first folder can comprise at least one of one or more sub-folders, or one or more files. In addition, evaluating the first set of parameters can comprise determining a first sum of respective sizes of the at least one of the one or more sub-folders or the one or more files that are accessed during a defined period. Evaluating the first set of parameters also can comprise determining a size of the first folder as a second sum of the respective sizes of the at least one of the one or more sub-folders or the one or more files. Further, evaluating the first set of parameters also can comprise determining an access percentage as a ratio between the first sum and the second sum.

According to some implementations, the first folder can comprise one or more files and evaluating the first set of parameters can comprise determining a total cost of the one or more files. Further to these implementations, determining the total cost can comprise accessing respective configuration metadata of files of the one or more files. In addition, respective costs of the one or more files can be stored in the respective configuration metadata.

In some implementations, determining the first folder is the outlier can comprise determining the first folder is different from the other folders of the tiered storage system based on a second result of a data cluster analysis.

The method also can comprise, according to some implementations, identifying, by the system, the first folder as the outlier. Further, the method also can comprise moving, by the system, the first folder to a different tiered storage system different from the tiered storage system.

Another embodiment relates to a system that can comprise a processor and a memory that stores executable instructions that, when executed by the processor, facilitate performance of operations. The operations can comprise determining respective parameters associated with objects of a group of objects of a tiered storage system, wherein the respective parameters comprise at least one of a size, an access percentage, or a cost. The operations also can comprise using the respective parameters associated with the objects of the group of objects as inputs, performing data clustering on the group of objects, resulting in at least one data cluster. Further, the operations can comprise selecting at least one object from the group of objects as at least one outlier object within the tiered storage system based on the at least one data cluster.

In an example, the objects can comprise respective collections comprising one or more other objects, one or more items, or combinations thereof. Further to this example, determining the respective parameters can comprise determining respective sizes of the respective collections. Additionally, or alternatively, determining the respective parameters can comprise determining respective access percentages for the one or more other objects, the one or more items, or combinations thereof of the respective collections. In an alternative, or additional, implementation, determining the respective parameters can comprise determining a sum of the cost of the one or more other objects, the one or more items, or combinations thereof of the respective collections. Further, the respective parameters further can comprise an access time and a modification time for respective ones of the one or more other objects, the one or more items, or combinations thereof. In some implementations, the at least one object and the one or more other objects can be folders, the one or more items can be files, and the tiered storage system can be a tiered file system.

According to some implementations, the respective costs can be retrieved from respective configuration files associated with the respective objects. In accordance with some implementations, selecting the at least one object can comprise, based on the at least one data cluster, identifying the at least one object of the group of objects that is different from other objects of the group of objects.

Another embodiment relates to a system that can comprise a processor and a memory that stores executable instructions that, when executed by the processor, facilitate performance of operations. The operations can comprise determining a parameter associated with a file in a tiered storage system and comparing the parameter with other parameters associated with other files in the tiered storage system. Further, the operations can comprise determining the file is an outlier based on the comparing indicating the file is different from the other files in the tiered storage system.

According to an example, the parameter can comprise at least one of an access time that indicates a last time the file was accessed, a modification time that indicates when the file was last modified, or a size of the file. According to some implementations, determining the file is the outlier can comprise using a result of a data cluster analysis between the file and the other files in the tiered storage system.

In some implementations, the operations can comprise identifying the file as the outlier. Further to these implementations, the operations can comprise moving the file to a different tiered storage system different from the tiered storage system.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
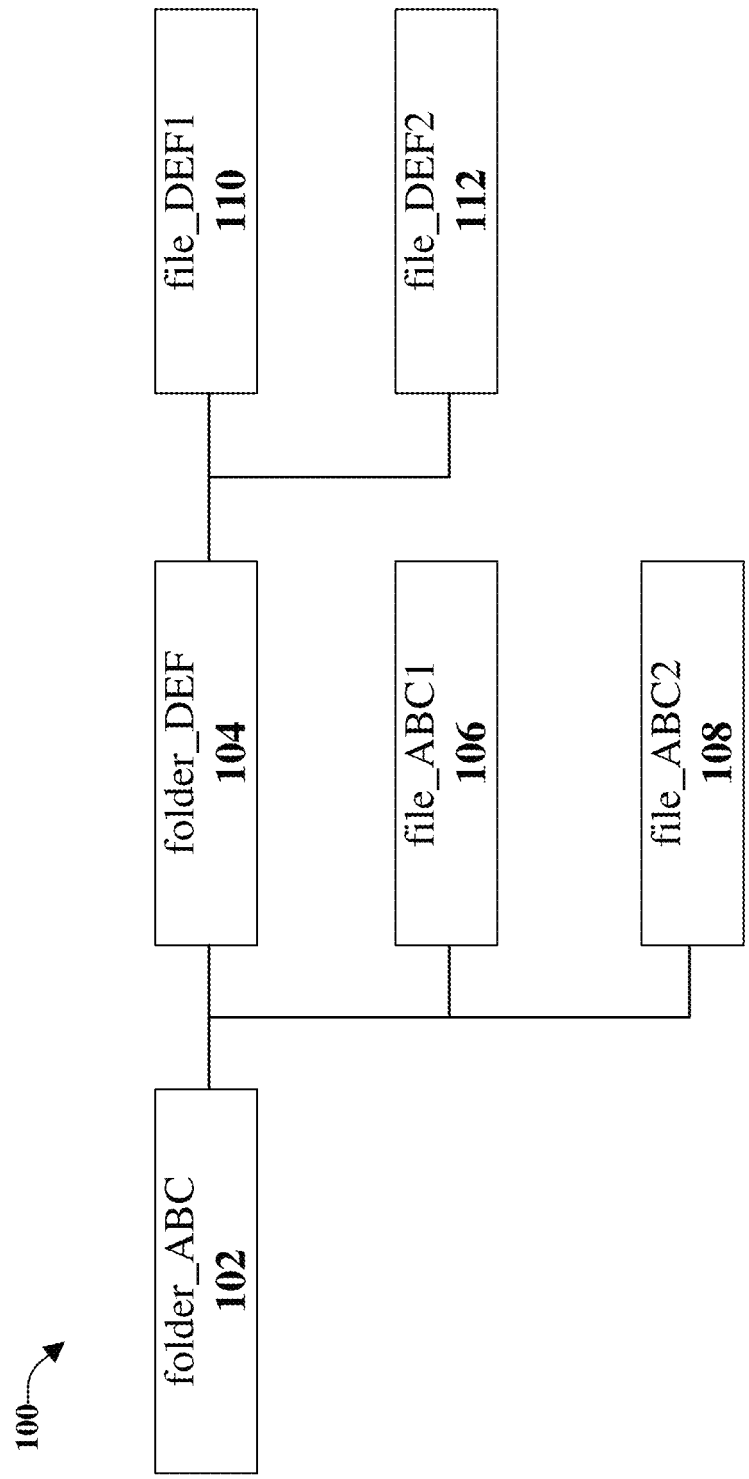
FIG. 1 illustrates an example, non-limiting, folder structure.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As mentioned, tiering is popular in file system implementation and users of such systems can obtain better performance with limited investment on high speed storage medium, as compared to non-tiered systems. Generally, users create tiering rules according workflow (e.g., name) or file access time (atime) and/or file modification time (mtime) of objects (files and/or folders). However, such solutions are not necessarily accurate, and, with time moving and usage changing, it is possible that file system performance can become worse for objects staying at or being moved to improper tiers. It is noted that atime can be more accurate to describe file access status, although in some file systems, obtaining accurate atime can be expensive and can impact processor (e.g., Input/Output (TO)) performance. Mtime can also be used for access status.

The disclosed aspects provide for the identification of outlier objects. Such outlier objects might not be suitable for tiers in which they are located. Therefore, moving such outliers to proper tiers can help to obtain better performance of file systems and computing performance can be improved.

Conventional systems have no solution for identifying outlier objects in tiers in file systems. As discussed herein, in addition to access statistics, such as atime and mtime, the size of file is also considered. Further, for outlier folder identification, access statistics, such as atime and mtime, are useless. Therefore, in addition to size, two additional statistics data, namely, folder access percentage and folder cost, can be included to identify outlier folders. The disclosed aspects can identify outlier items without user input. Accordingly, the disclosed aspects can be operated independently and determine the gap between defined tiering rules and additional outlier rules. Further, the disclosed aspects can perform outlier determination to filter out abnormal objects in tiers.

Tiering can help improve file system performance. It is noted, however, that good tiering rules are not easy to create. Generally, file systems allow users to define tiering policies, such as, but not limited to, file policy of smart pool. File systems also allow for movement of objects among tiers according to these policies. Conventionally, tiering rules are created by object name and atime and/or mtime, among others:

For example, one or more rules can be created by object name. For example, project A was accomplished one month ago, and it is determined that related data should be moved to low speed storage. Thus, a tiering rule can be created as: Move folders with name project A to tier 3 (slow tier).

Alternatively, one or more rules can be created by atime and/or mtime. For example, this can involve the movement of hot files (e.g., files used quite often) to fast storage. In another example, this can involve the movement of files that have been accessed during a defined time interval (e.g., the past 2 weeks) to tier 1 (e.g., fast tier). Thus, a tiering rule can be created as: Move file to tier 1, whose atime <2 weeks.

While, it is possible that, for rules associated with the object name, files in folder 123, sub-folder of project A, can still be used by other groups; for rules associated with the atime and/or mtime, large file ABC, with size as 1 Gigabyte (GB), can be moved to tier 1 and never be accessed after being read one time 7 days ago. In both cases, file and/or folder can be placed into an improper tier, which can reduce the performance or occupy of the unnecessary resource. Conventionally, there is no manner of finding such outlier objects of each tier and, therefore, the full use of the whole system and benefits thereof cannot be obtained with high efficiency.

Accordingly, the disclosed aspects can facilitate outlier object detection, which can be useful to determine which objects are unique and might not be appropriate to remain associated with its current tier(s). As discussed, name and atime and/or mtime have conventionally been used to create tiering rules. However, such tiering rules are not able to determine one or more outliers.

For a file, size can play an important role for outlier identify. Similar to the example mentioned above, a 1 GB file is more suspicious than a file with 128 KB. However, simply considering size without other attributes is not correct and is addressed with the disclosed aspects. Further, for a folder, atime and/or mtime rules for a folder are nearly useless for tiering. This is because, generally, atime and/or mtime for the folder just describes the access status of files and sub-folders under that folder. These rules do not determine anything about the files and/or folders under any sub-folders.

For example, FIG. 1 illustrates an example, non-limiting, folder structure 100. It is noted that this folder structure 100 is simple for purposes of describing the various embodiments. However, folder structures utilized with the various embodiments discussed herein can be more complex than the folder structure 100 illustrated and described.

The folder structure 100 comprises a first folder (folder_ABC 102). Under folder_ABC 102 are a second folder (folder_DEF 104) and two files, illustrates as file_ABC1 106 and file_ABC2 108. Under folder_DEF 104 are two files, illustrated as file_DEF1 110 and file_DEF2 112. When file_ABC1 106 and file_ABC2 108 are to be modified, or when folder_DEF 104 is to be renamed, the atime and/or mtime of folder_ABC 102 will change. It is noted that such attributes will not update if file-DEF1 110 and file_DEF2 112 are modified or renamed. Therefore, atime and/or mtime of folder_ABC 102 cannot reflect the access status of the entirety of folder_ABC 102 and, therefore, are not used for tiering.

Since atime and/or mtime of folder cannot assist with determining one or more outlier, two new parameters can be useful for outlier folder finding. These parameters are folder access percentage and folder cost. Folder size is the size of all files under the folder, as indicated by the following formula:

$$\text{Folder Size} = \Sigma \text{size of all files under that folder} \quad \text{Formula 1.}$$

The first folder (folder_ABC 102) in FIG. 1 will be used as an example, assume files size under folder_ABC are as indicated in the following table that lists the file size status:

TABLE 1

| File Name | Size |
|---|---|
| file_ABC1 | 100 KB |
| file_ABC2 | 200 KB |
| file_DEF1 | 300 KB |
| file_DEF2 | 400 KB |

As indicated in Table 1 above, the folder size of the first folder (folder_ABC 102) is 10,000 KB, since the first folder comprises all the files listed in Table 1. Further, folder_DEF has a folder size of 700 KB (because this folder comprises file_DEF1 (300 KB) and file_DEF2 (400 KB).

Folder access percentage is a type of statistics data for folder access. Folder access percentage can be defined as a ratio between the sum of the size of accessed files and the sum of the size of all files during a defined period, as indicated by the following formula:

$$\text{Access Percentage of Folder} = \frac{\sum \text{size of files to be accessed}}{\sum \text{size of files in that folder}}. \quad \text{Formula 2}$$

With reference again to FIG. 1, assume files under folder_ABC have been accessed as indicated in the table below that details files access status.:

TABLE 2

| File Name | Size | Accessed Time |
|---|---|---|
| file_ABC1 | 100 KB | 1 day ago |
| file_ABC2 | 200 KB | 8 days ago |
| file_DEF1 | 300 KB | 3 days ago |
| file_DEF2 | 400 KB | 15 days ago |

The access percentage for folder folder_ABC is 0.4 (file_ABC1 and file_DEF1) and 0.6 (file_ABC1, file_ABC2 and file_DEF1) for the last 7 days and 14 days, respectively.

Folder cost is a type of finical statistics data that can be important to management. Folder cost is defined as how much budget is be occupied, as indicated by the formula below:

$$\text{Folder Cost} = \Sigma \text{cost of files in that folder} \quad \text{Formula 3.}$$

Table 3 below illustrate example, non-limiting file tiering status, using the example of FIG. 1.

TABLE 3

| File Name | Size | Tier |
|---|---|---|
| file_ABC1 | 100 KB | Tier 1 |
| file_ABC2 | 200 KB | Tier 2 |
| file_DEF1 | 300 KB | Tier 3 |
| file_DEF2 | 400 KB | Tier 2 |

Further, Table 4 below illustrates example, non-limiting, tier costs associated with the folder structure 100 of the file system of FIG. 1.

TABLE 4

| Tier | Tier Cost | Tier Type |
|---|---|---|
| Tier 1 | $10/GB/year | SSD |
| Tier 2 | $5/GB/year | SAS |
| Tier 3 | $2/GB/year | SATA |

Using the example of FIG. 1, the file tiering is as indicated in Table 2 and tier cost is as indicated in Table 3. Therefore, the folder cost of folder folder_ABC and folder_DEF are $0.0046 and $0.0026, respectively.

It is noted that, generally, atime is more accurate to describe file access status. However, in some file systems, accurate atime is becoming expensive and impacts IO performance. Further, as indicated, mtime also could be used for access status.

Figure 2:
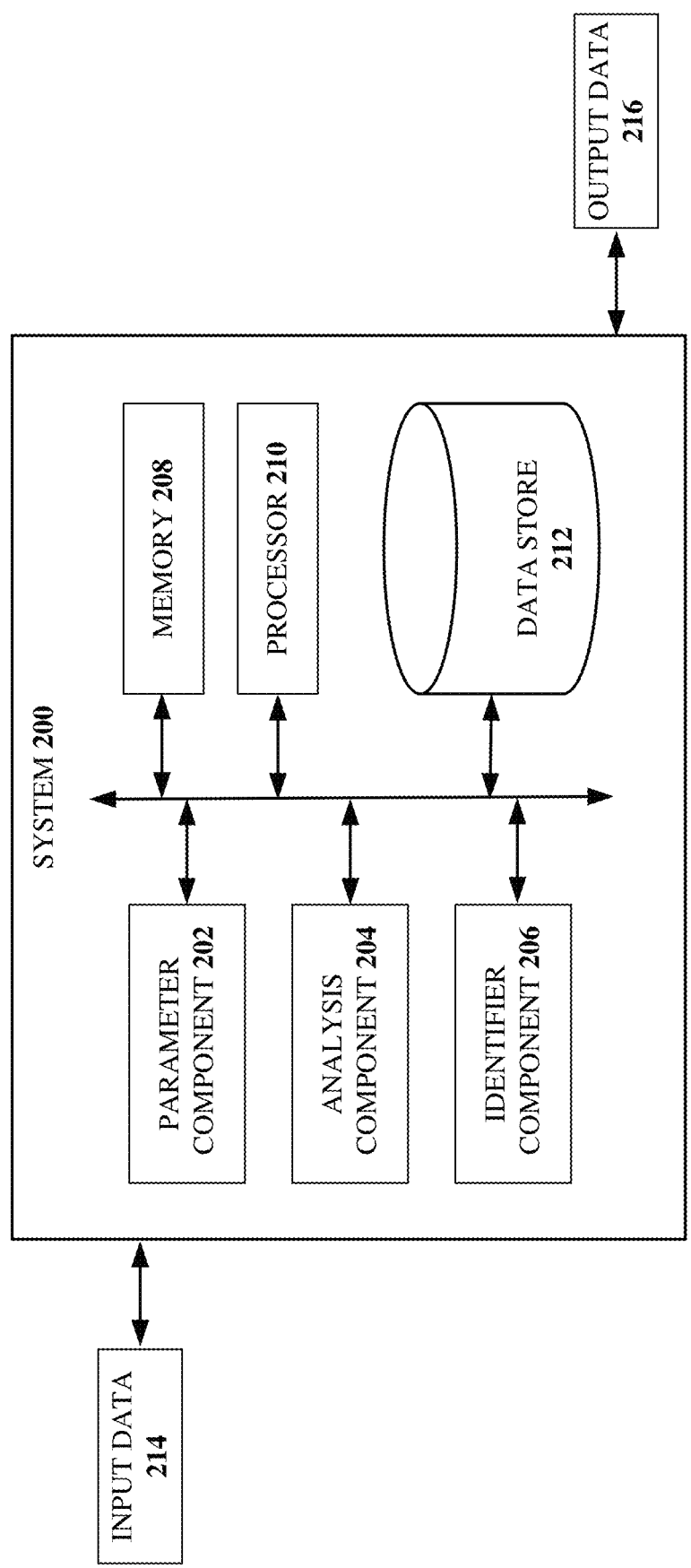
FIG. 2 illustrates a block diagram of an example, non-limiting, system for facilitating outlier object detection in tiered file systems in accordance with one or more embodiments described herein.

FIG. 2 illustrates a block diagram of an example, non-limiting, system 200 for facilitating outlier object detection in tiered file systems in accordance with one or more embodiments described herein. Aspects of systems (e.g., the system 200 and the like), apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 200 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 200 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 200 (and the other embodiments described herein) can be utilized for outlier detection, which can help to identify improper objects in existing tiers and allow for the exploitation of tiering file system with higher efficiency. In the disclosed aspects, besides atime and/or mtime, size, folder access percentage and folder cost are involved, and such attributes help detection become more accurate.

As illustrated the system 200 can comprise a parameter component 202, an analysis component 204, an identifier component 206, at least one memory 208, at least one processor 210, and at least one data store 212. The parameter component 202 can determine respective parameters associated with objects of a set of objects (e.g., folders) of a tiered storage system. The respective parameters can comprise at least one of a size, an access percentage, and a cost.

For example, the parameter component 202 can obtain, as input data 214 one or more attributes associated with folder and/or files to be monitored. The input data 214 can include, but is not limited to, size, atime, mtime, folder access percentage, folder cost, or combinations thereof.

For example, for outlier file detection, input data 214 for all files to be monitored can be obtained. The input data 214 can include various attributes associated with the files. For example, the various attributes can include, but are not limited to, respective file sizes and respective file atime and/or mtime for the files being monitored. For outlier folder detection, input data 214 can include, but is not limited to, tier cost and one or more all files (or other folders) under folders being monitoring. For example, the one or more attributes can include size, atime and/or mtime, and tier. According to some implementations, the parameter component 202 can obtain the tier cost from a configuration file (e.g., metadata). For example, the cost status can be entered into the config file and the parameter component 202 (as part of outlier detection) can read such values for further calculation.

Further, the parameter component 202 can obtain input data 214 (e.g., the file attributes) in several different ways. For example, the parameter component 202 can traverse all files and obtain the attributes of the file. For example, in a Linus/Unix Sysm a call (stat and OneFS command isi get) can be made. In an alternative example, OneFS command: (isi get —R) can be made. According to some implementations, other tools (e.g., DataIQ in Isilon, FSA in Isilon, or other similar tools) can be utilized. However, the disclosed aspects are not meant to be limited to these tools and/or commands.

The analysis component 204 can determine (e.g., calculate) the folder size and the folder cost in a similar manner. For example, the analysis component 204 can go through all the files under a specific folder and obtain a sum of the cost and cost (file size*tier cost), respectively. For the access percentage, in addition to folder size, another sum of files (match with the time slot specified) size also can be fetched by the parameter component 202. These three values can be obtained within the files traversing in file attributes.

The analysis component 204 can perform an analysis on the set of objects. The respective parameters associated with the objects of the set of objects can be inputs for the analysis. According to some implementations, the analysis performed by the analysis component 204 can be data clustering in order to determine an improper object (e.g., an outlier). For example, the analysis component 204 can use data clustering to identify special objects among all monitored items. Multiple data clustering methods can be used by the analysis component 204. For example, DBSCAN (Density-based spatial clustering of applications with noise) is an example of a data clustering method that can be utilized by the analysis component 204. However, other types of data clustering methods can be utilized.

According to some implementations, the analysis component 204 can be (or can be associated with) a data clustering component that can identify outlier objects in one tier or in multiple tiers. For outlier file detection, atime and/or mtime and size for every file are used for outlier file identifying by the analysis component 204. Further, for outlier folder detection, size, access percentage, and folder cost are used. It is noted that according to some implementations, any combination of these parameters can be used as input of data clustering to find out improper folder (e.g., an outlier).

The identifier component 206 can select at least one object from the set of objects as an outlier object within the tiered storage system based on the analysis (e.g., the data clustering). Thus, the identifier component 206 can detect the outlier file(s) and/or the outlier folder(s) and provide information indicative of the outlier file(s) and/or outlier folder(s) as output data 216. To detect the outlier file and/or the outlier folders, the identifier component 206 can cluster the objects into groups and the ones that do not belong any groups can be considered as the outliers. In an example, various criteria can be utilized by the identifier component 206 for clustering. These criteria can include point, maximum distance between two points to be considered as neighbors of one another, minimum number of points needed to form a dense region, and a metric to calculate the distance between the data points.

The various aspects related to outlier detection describe herein can identify improper objects in a tiering file system. A data clustering method can be used to filter out abnormal objects, and, in addition to atime and/or mtime, size, folder access percentage and folder cost are enrolled as the input data 214. These attributes can assist with determining outlier objects more accurately than with atime and/or mtime only. The parameters used by the detection method can be from file and/or folder attributes, according, no manual input is needed. Accordingly, the various aspects discussed herein can execute automatically without manual interaction (e.g., dynamic execution).

For file outlier detection (in same tier), the point can comprise two dimensions, size and mtime. A point can be created for every monitored file in same tier. The maximum distance can be between two points to be considered as neighbors of one another. For maximum distance, the recognition component 108 can select several (e., 3, 5, and so on) pairs points randomly. Further, the recognition component 108 can calculate the distance between points in each pair and use the minimum value as the maximum distance. The minimum number of points can be the minimum number of points required to form a dense region. This number can be a small number (e.g., 3, 5, and others). Further, the metric can be used to calculate the distance between the data points. For the metric of distance, several solutions, such as Euclidean distance, Minkowski distance, precomputed distance and Cosine distance, can be used by the identifier component 206.

In an example, for outlier file detection, the system 200 can obtain input data, such as attributes (size and atime and/or mtime) for all files to be monitored. Upon or after obtaining the input data, outlier file detection can be performed (e.g., data clustering). Based on the outlier file detection, one or more outlier files can be obtained.

Folder outlier detection can be similar to file outlier detection. A point with any two or three dimensions (among folder size, folder access percentage and folder cost) can be created for every monitored folder. For metric of distance, several solutions, such as Euclidean distance (not good for high number dimensions), Minkowski distance, precomputed distance and Cosine distance, can be used. For maximum distance, several pairs points can be selected randomly, distance for each pair can be calculated, and the minimum value can be used as the maximum distance. For the minimum number of points required to form a dense region, a small number (e.g., 3, 5) can be used.

In an example, for outlier folder detection, the system 200 can obtain input data, such as by obtaining a tier cost from a configuration file. Further, the system 200 can obtain attributes (e.g., size, atime and/or mtime, tier) for all files under folders that are to be monitored. The system 200 can determine folder size, access percentage, and folder cost for folders to be monitored. Outlier folder detection can be performed (e.g., data clustering). Based on the outlier file detection, one or more outlier folders can be obtained.

With continuing reference to FIG. 2, the at least one memory 208 can be operatively connected to the at least one processor 210. The at least one memory 208 can store executable instructions and/or computer executable components (e.g., the parameter component 202, the analysis component 204, the identifier component 206, and so on) that, when executed by the at least one processor 210 can facilitate performance of operations. Further, the at least one processor 210 can be utilized to execute computer executable components (e.g., the parameter component 202, the analysis component 204, the identifier component 206, and so on) stored in the at least one memory 208.

For example, the at least one memory 208 can store protocols associated with facilitating outlier object detection in tiered storage systems as discussed herein. Further, the at least one memory 208 can facilitate action to control communication between the system 200 and other systems, one or more file storage systems, one or more user equipment devices, such that the system 200 employ stored protocols and/or algorithms to achieve improved overall performance of tied object storage systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 210 can facilitate respective analysis of information related to facilitating outlier object detection in tiered storage systems. The at least one processor 210 can be a processor dedicated to analyzing and/or generating information received, a processor that controls one or more components of the system 200, and/or a processor that both analyzes and generates information received and controls one or more components of the system 200.

Figure 3:
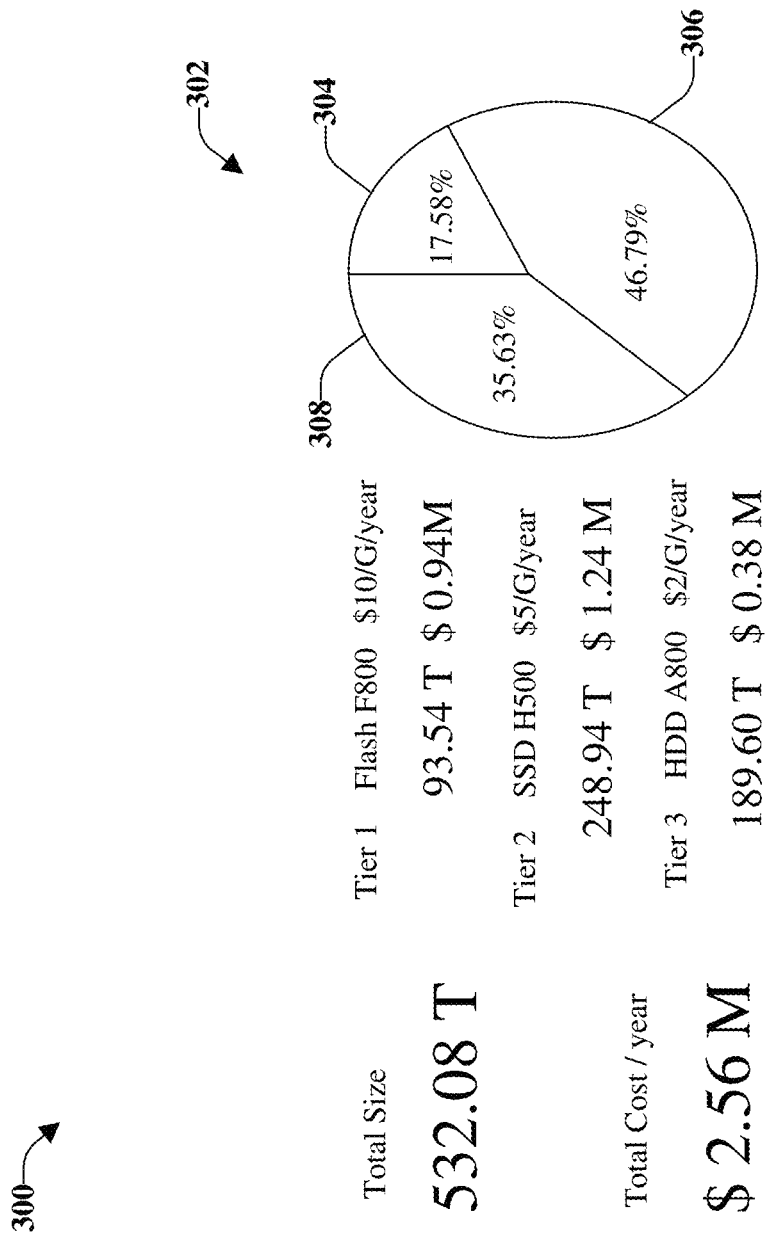
FIG. 3 illustrates a non-limiting example of overall status and tiering information of a tiering file system in accordance with one or more embodiments described herein.

FIG. 3 illustrates a non-limiting example of overall status and tiering information of a tiering file system in accordance with one or more embodiments described herein. It is noted that this overall status and tiering information is for purposes of explanation and the disclosed aspects are not limited to this implementation.

A first tier (Tier 1) is a flash drive (F800) that has a size of 93.54 T, at a cost of nine hundred forty thousand dollars ($0.94 M) per year. A second tier (Tier 2) is a SSD H500 that has a size of 248.94 T, at a cost of $1.24 M per year. Further, a third tier (Tier 3) is a HDD A800 that has a size of 189.60

T, at a cost of three hundred eighty thousand dollars ($0.38 M). Accordingly, the cost of Tier 1 per gigabyte per year is ten dollars ($10/G/year). The cost of Tier 2 per gigabyte per year is five dollars ($5/G/year). Further the cost of Tier 3 per gigabyte per year is two dollars ($2/G/year). As indicated by the pie chart 302, the first tier (tier 1) represents 17.58% of the total tiered storage system, as indicated at 304. The second tier (Tier 2) represents 46.79% of the total tiered storage system, as indicated at 306. Further, the third tier (Tier 3) represents 35.65% of the total tiered storage system, as indicated at 308. Accordingly, a total size of the tiered storage system is 532.08 Terabytes (T) and a total cost per year is two million five hundred sixty thousand dollars ($2.56 M).

Figure 4:
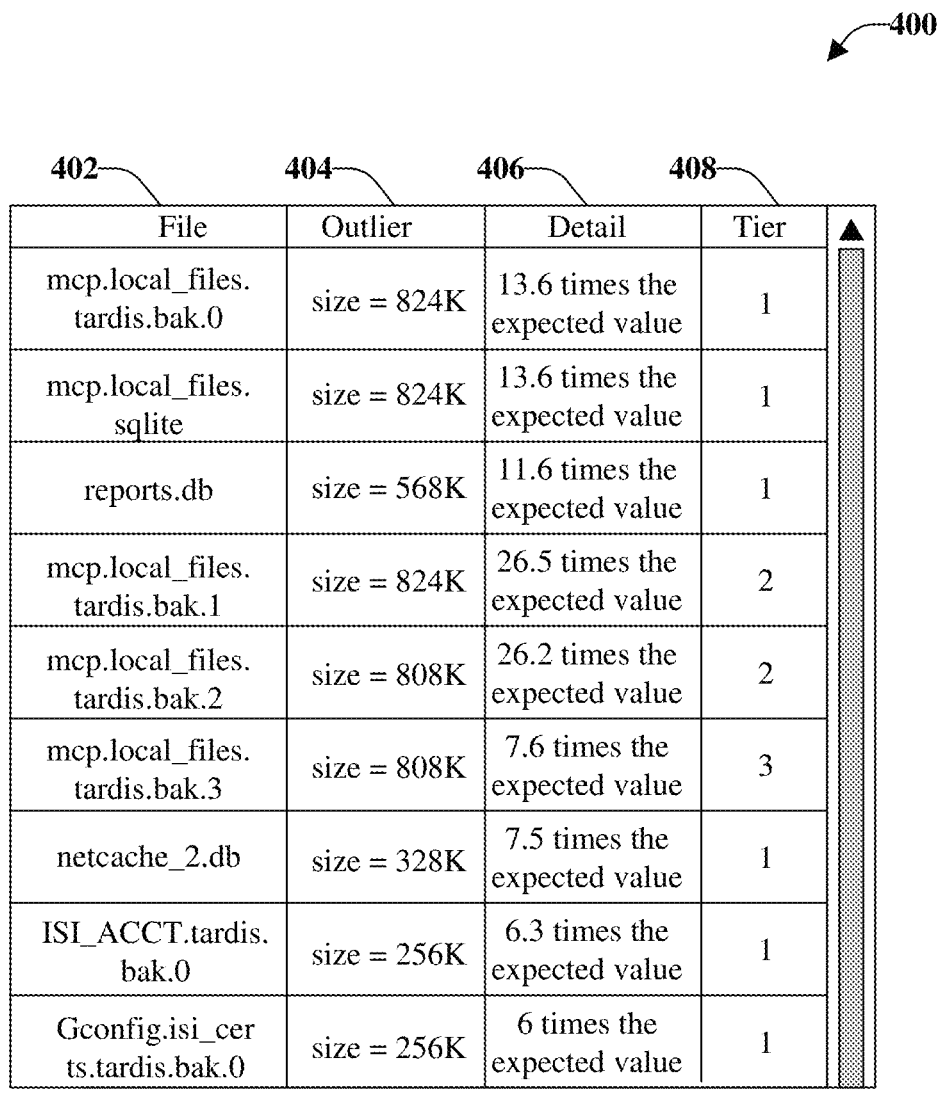
FIG. 4 illustrates an example, non-limiting, outlier list for the tiering file system of FIG. 3 in accordance with one or more embodiments described herein.

For file outlier detection, a folder can be assigned to determine file outliers. In an example, Euclidean distance can be set as metric of distance and a numeral (e.g., 5) can be set as minimum number of points required to form a dense region. FIG. 4 illustrates an example, non-limiting, outlier list for the tiering file system of FIG. 3 in accordance with one or more embodiments described herein.

As illustrated for each file, indicated in column 402, size of the outlier is indicated in column 404. Details related to how the size of the outlier compares to an expected value is detailed in column 406. In addition, the tier to which the outlier belongs is indicated in column 408. It is noted that this is an example and other manners of identifying and providing information related to the outliers can be utilized with the disclosed aspects.

Figure 5A:
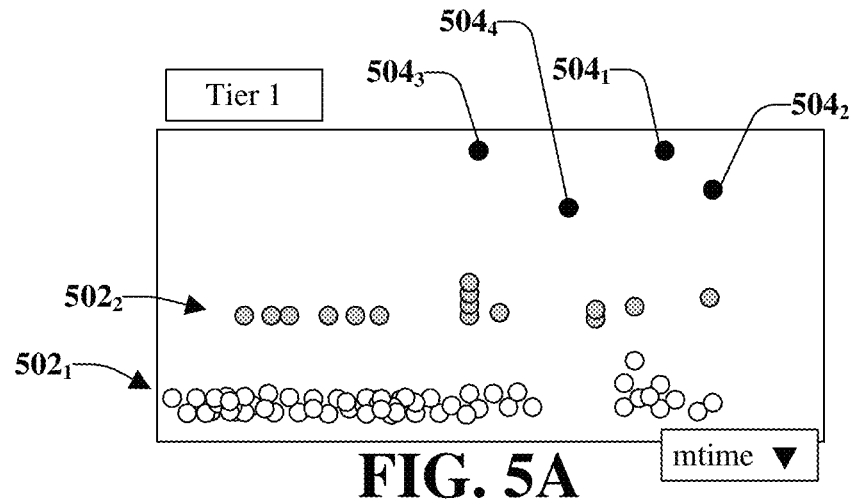
FIGS. 5A-5C illustrate example, non-limiting, representations of overall data groups for tiers of a tiered storage system in accordance with one or more embodiments described herein.
Figure 5B:
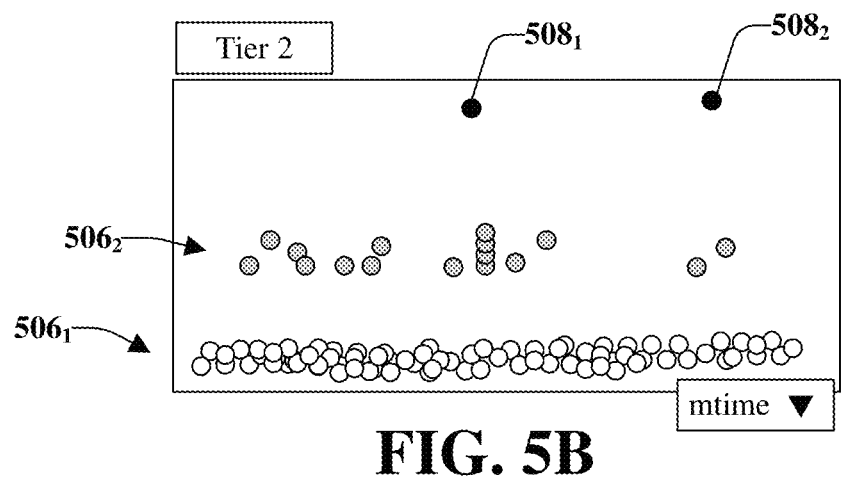
Figure 5C:
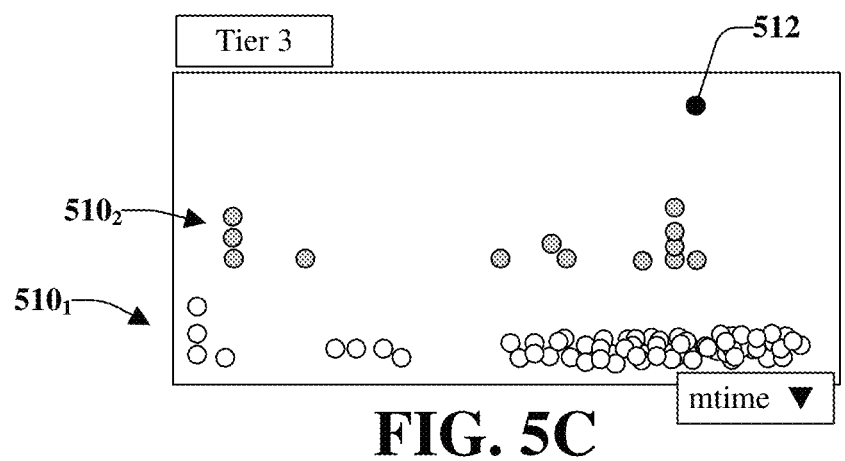

FIGS. 5A-5C illustrate example, non-limiting, representations of overall data groups for tiers of a tiered storage system in accordance with one or more embodiments described herein.

FIG. 5A illustrates an example data cluster for Tier 1. Tier 1 comprises a data cluster with a first set of objects 5021 (indicated by the unfilled circles) that are grouped together and a second set of objects 5022 (indicated by the shaded circles) that are grouped together. Also included in Tier 1 are outlier files, namely, a first object 5041, a second object 5042, a third object 5043, and a fourth object 5044. These outlier files can be identified by the identifier component 206.

FIG. 5B illustrates a data cluster for Tier 2. Tier 2 comprises a data cluster with a first set of objects 5061 (indicated by the unfilled circles) that are grouped together and a second set of objects 50622 (indicated by the shaded circles) that are grouped together. Also included in Tier 2 are outlier files, namely, a first object 5081 and a second object 5082.

FIG. 5C illustrates a data cluster for Tier 3. Tier 3 comprises a data cluster with a first set of objects 5101 (indicated by the unfilled circles) that are grouped together and a second set of objects 51022 (indicated by the shaded circles) that are grouped together. Also included in Tier 3 is an outlier file, namely, a single object 512.

Figure 6:
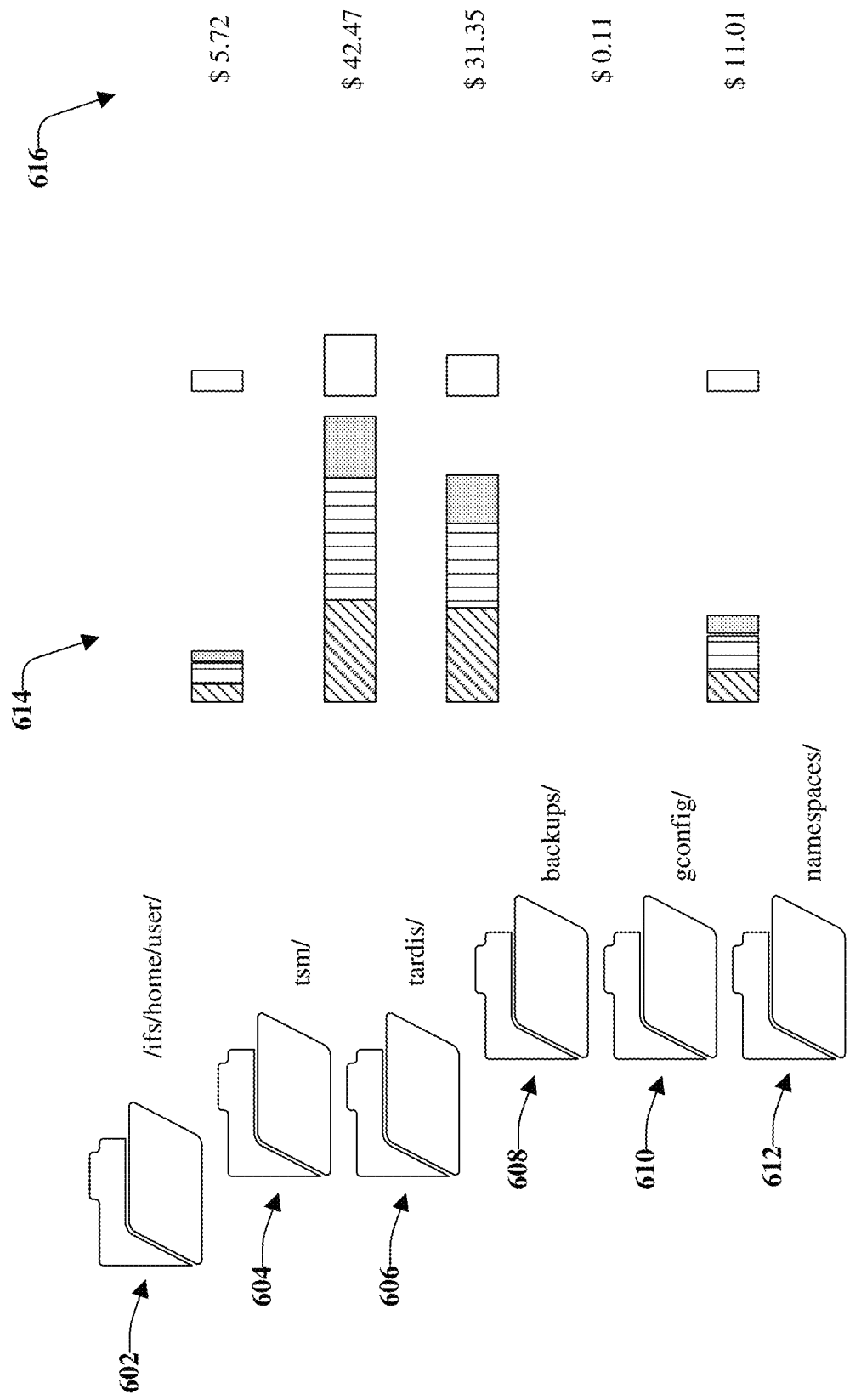
FIG. 6 illustrates an example, non-limiting, representation of folder outlier detection in accordance with one or more embodiments described herein.

FIG. 6 illustrates an example, non-limiting, representation of folder outlier detection in accordance with one or more embodiments described herein. Folders under a first folder 602 (/ifs/home/user/) can be selected for the purposes of identifying an outlier object. Folders under the first folder 602 include, in this example, a second folder 604 (tsm/) and a third folder 606 (tardis/). Additional folders under the first folder 602 and the third folder 606 include a fourth folder 608 (backups/), a fifth folder 610 (gconfig/) and a sixth folder 612 (namespaces/). Accordingly, the second folder 604, the third folder 606, the fourth folder 608, the fifth folder 610, and the sixth folder 612 can be selected for identification of an outlier object under the first folder 602.

Folder size and folder access percentage (modified percentage) can be used to describe every point. Further, Euclidean distance can be set as a metric of distance and a defined value can be set as a minimum number of points required to form a dense region. In an example, the defined value can be five, however, the disclosed aspects are not limited to this value and another value can be used.

Also illustrated are example, non-limiting, tiering statistics 614 that represent percentage for each tier, identified by different filled blocks. Also illustrated are example, non-limiting, costs 616 associated with each folder. It is noted that the tiering statistics 614 and costs 616 are for explanation purposes only.

Figure 7:
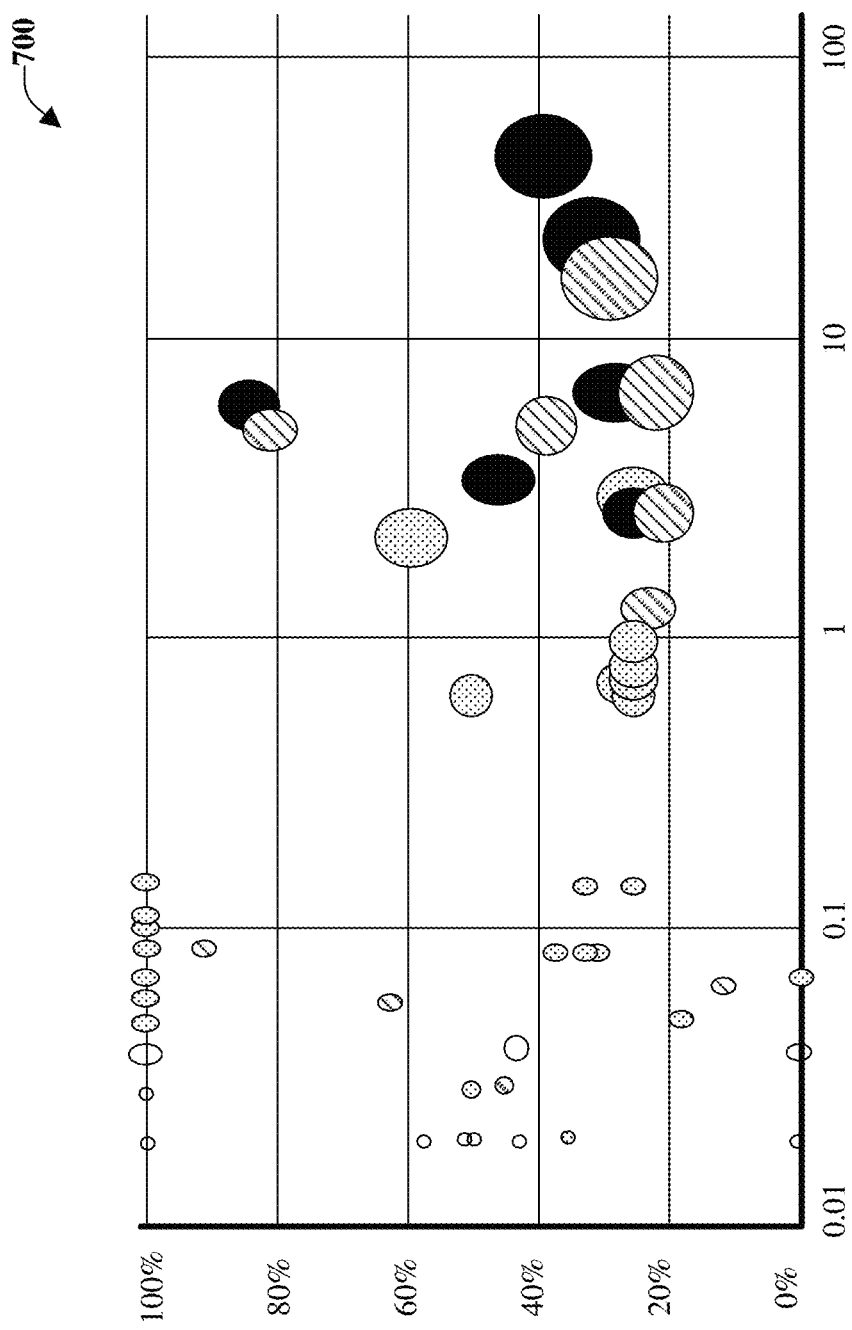
FIG. 7 illustrates an example, non-limiting, chart of percentages of modified files for the overall data groups of FIG. 6 in accordance with one or more embodiments described herein.

FIG. 7 illustrates an example, non-limiting, chart 700 of percentages of modified files for the overall data groups of FIG. 6 in accordance with one or more embodiments described herein. The different circles represent the different tiers. For example, unfilled circles represent a first tier, dot-filled circles represent a second tier, hashed circles represent a third tier, and filled circles represent a fourth tier. It is noted that the identification of first, second, third, and fourth, is for purposes of distinguishing the tier and is not meant to indicate a particular order of the tiers.

Figure 8:
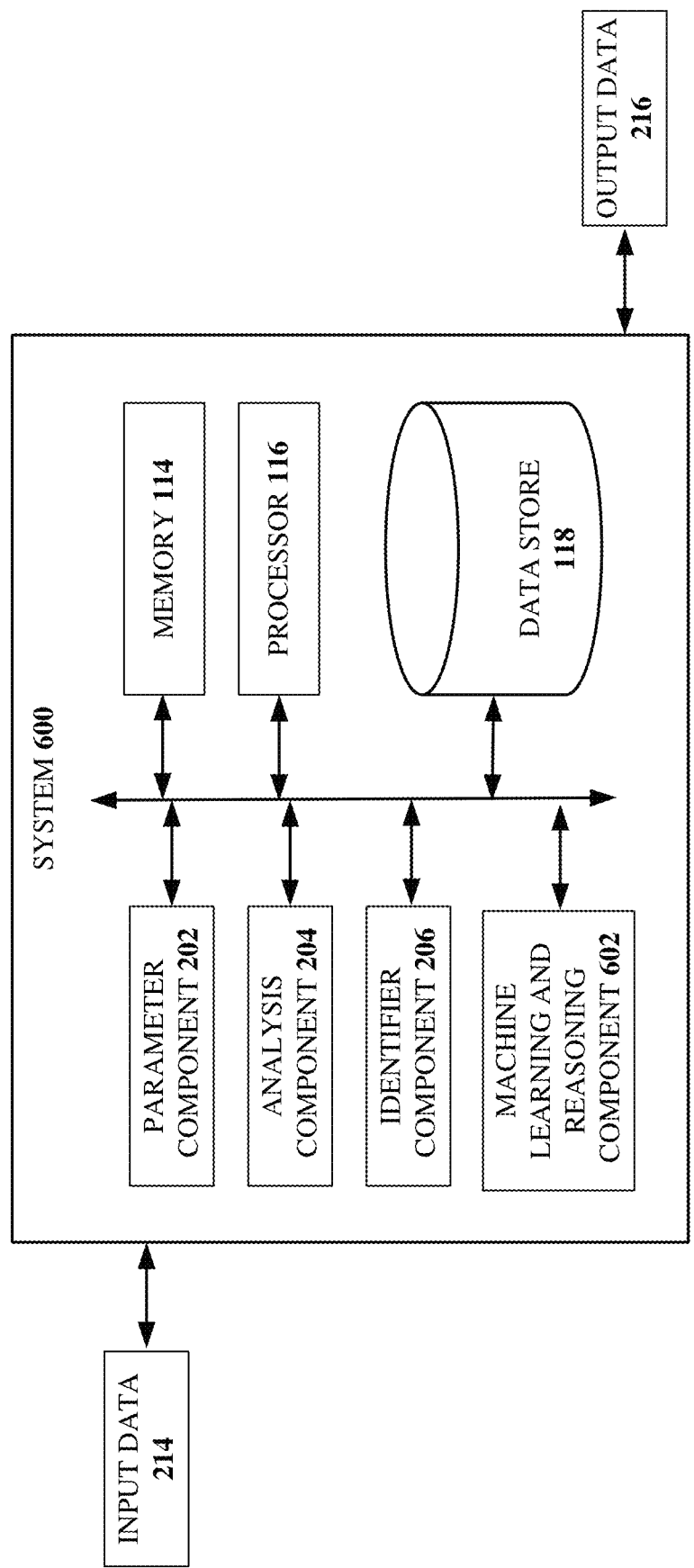
FIG. 8 illustrates an example, non-limiting, system that employs automated learning to facilitate one or more of the disclosed aspects in accordance with one or more embodiments described herein.

FIG. 8 illustrates an example, non-limiting, system 800 that employs automated learning to facilitate one or more of the disclosed aspects in accordance with one or more embodiments described herein. Repetitive description of like elements employed in other embodiments described herein is omitted for sake of brevity. The system 800 can comprise one or more of the components and/or functionality of the system 200 and vice versa.

As illustrated, the system 800 can comprise a machine learning and reasoning component 802 that can be utilized to automate one or more of the disclosed aspects. The machine learning and reasoning component 802 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 802 can employ principles of probabilistic and decision theoretic inference. Additionally, or alternatively, the machine learning and reasoning component 802 can rely on predictive models constructed using machine learning and/or automated learning procedures. Logic-centric inference can also be employed separately or in conjunction with probabilistic methods.

The machine learning and reasoning component 802 can infer which objects (e.g., folders) and/or items (e.g., files) are outliers and should not be included in a current tier of a tiered storage system by obtaining knowledge about one or more parameters associated with the one or more objects and/or the one or more items. Based on this knowledge, the machine learning and reasoning component 802 can make an inference based on which object (e.g., folder) and/or item (e.g., file) is an outlier, whether the object and/or item should be moved to a different storage system, providing one or more recommendations, automatically moving the object and/or item, or combinations thereof.

As used herein, the term "inference" refers generally to the process of reasoning about or inferring states of a storage system, a component, a module, an environment, and/or devices from a set of observations as captured through events, reports, data and/or through other forms of communication. Inference can be employed to identify if any outlier folders and/or files exist, whether outlier detection should be dynamically performed, whether one or more folders and/or files should be moved from a first storage system to a second storage system based on object outlier detection, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with outlier detection in tiered storage systems) can employ various artificial intelligence-based schemes for carrying out various aspects thereof. For example, a process for determining if one or more outlier files and/or folders exist and the handling of such files and/or folders can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine when and how outlier files and/or folders should be evaluated and action taken based on the determination. A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing file and/or folder behavior, by receiving intrinsic information, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to evaluate a tiered storage system for outliers, how to identify the outliers, what to do with the outliers when discovered, and so forth.

Additionally, or alternatively, an implementation scheme (e.g., a rule, a policy, and so on) can be applied to control and/or regulate when to (or when not to) detect outliers. In some implementations, based upon a predefined criterion, the rules-based implementation can automatically attempt to detect outliers. In response thereto, the rule-based implementation can automatically interpret and carry out functions associated with the outlier detection by employing predefined rule(s) and/or programmed rule(s) based upon any desired criteria.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 9:
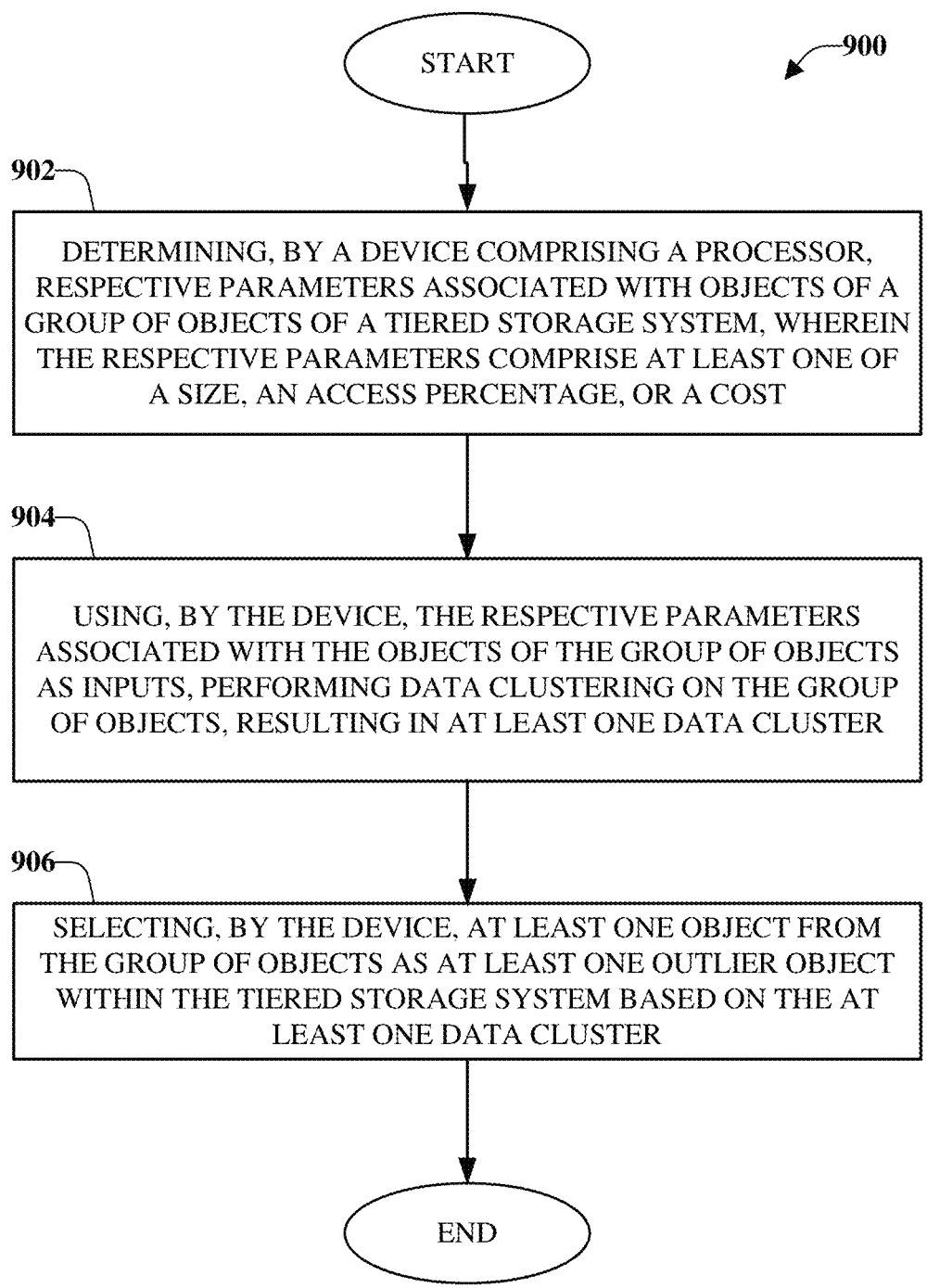
FIG. 9 illustrates a flow diagram of an example, non-limiting, computer-implemented method that facilitates outlier detection in tiered storage systems in accordance with one or more embodiments described herein.

FIG. 9 illustrates a flow diagram of an example, non-limiting, computer-implemented method 900 that facilitates outlier detection in tiered storage systems in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

At 902 of the computer-implemented method 900, a device comprising a processor can determine respective parameters associated with objects of a group of objects of a tiered storage system. The respective parameters can comprise at least one of a size, an access percentage, or a cost. In an example, the objects can comprise respective collections comprising one or more other objects, one or more items, or combinations thereof. In some implementations, the respective parameters also can comprise an access time and a modification time for respective ones of the one or more other objects, the one or more items, or combinations thereof. In another example, the at least one object and the one or more other objects can be folders. Further to this example, the one or more items can be files and the tiered storage system can be a tiered file system.

According to some implementations, determining the respective parameters can comprise determining respective sizes of the respective collections. In some implementations, determining the respective parameters can comprise determining respective access percentages for the one or more other objects, the one or more items, or combinations thereof of the respective collections. In some implementations, determining the respective parameters can comprise determining a sum of the cost of the one or more other objects, the one or more items, or combinations thereof of the respective collections. The respective costs can be retrieved from respective configuration files associated with the respective objects, according to an implementation.

The respective parameters associated with the objects of the group of objects can be used, at 904 of the computer-implemented method 900, as inputs. Further, data clustering can be performed on the group of objects, resulting in at least one data cluster.

Further, at 906 of the computer-implemented method 900, at least one object can be selected from the group of objects as an outlier object within the tiered storage system based on at least one data cluster. In an implementation, determining the outlier object can comprise, based on the at least one data cluster, identifying at least one object of the group of objects that is different from other objects of the group of objects.

Figure 10:
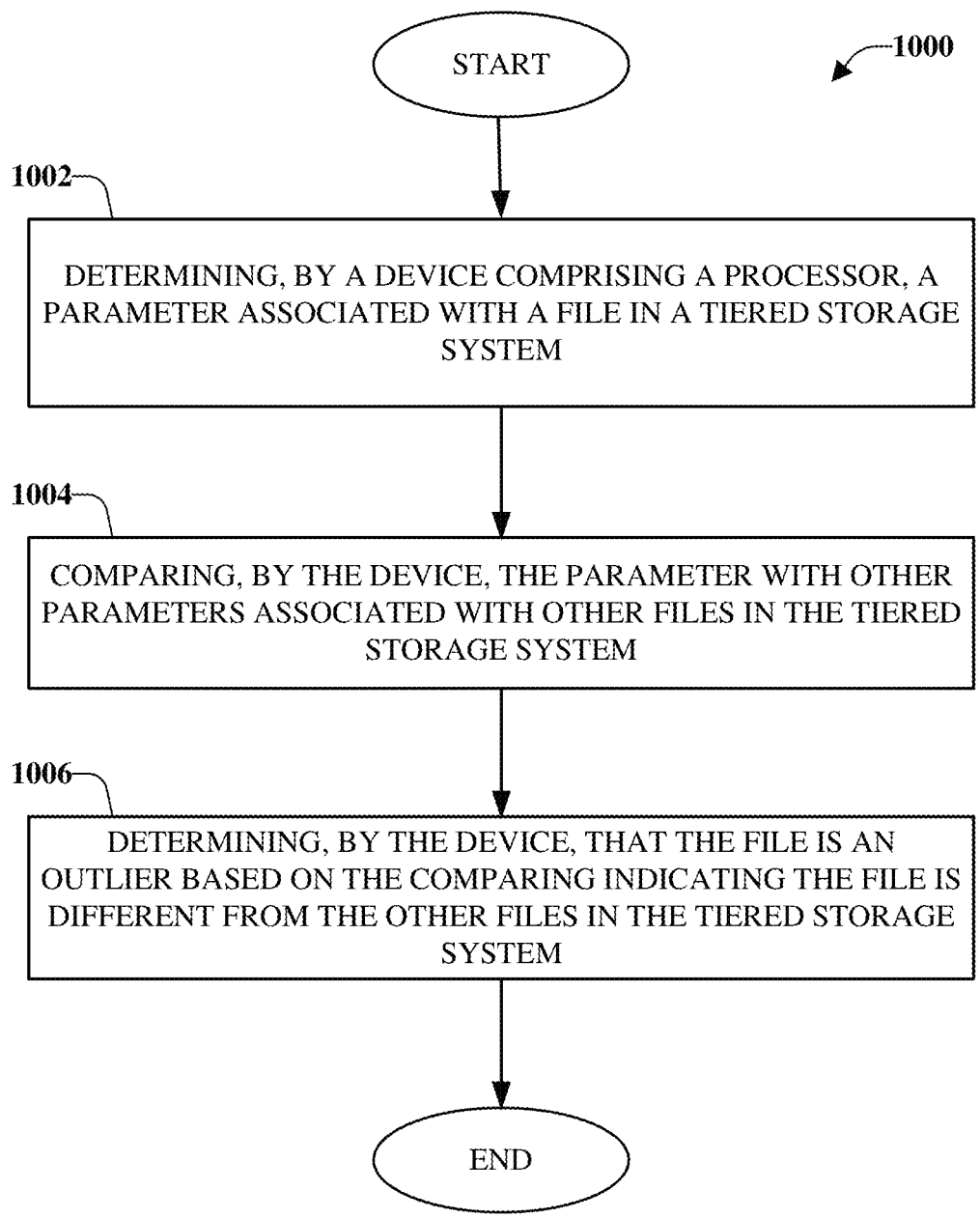
FIG. 10 illustrates a flow diagram of an example, non-limiting, computer-implemented method that identifies outlier files in a tiered storage system in accordance with one or more embodiments described herein.

FIG. 10 illustrates a flow diagram of an example, non-limiting, computer-implemented method 1000 that identifies outlier files in a tiered storage system in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

At 1002 of the computer-implemented method 1000, a device comprising a processor can determine a parameter (or more than one parameter) associated with a file in a tiered storage system. The parameters can comprise at least one of an access time that indicates a last time the file was accessed, a modification time that indicates when the file was last modified, and/or a size of the file.

The parameter can be compared with other parameters associated with other files in the tiered storage system, at 1004. The other parameters can be parameters similar to the parameter of the file, as determined at 1002. Further, it can be determined, at 1006 of the computer-implemented method 1000, that the file is an outlier based on the comparison indicating the file is different from the other files in the tiered storage system. In an example, determining the file is the outlier can comprise using a result of a data cluster analysis between the file and the other files in the tiered storage system.

According to some implementations, the computer-implemented method 1000 can comprise identifying the file as the outlier. Further, the computer-implemented method 1000 can comprise moving the file to a different tiered storage system, which is different from the tiered storage system (e.g., the original tiered storage system).

Figure 11:
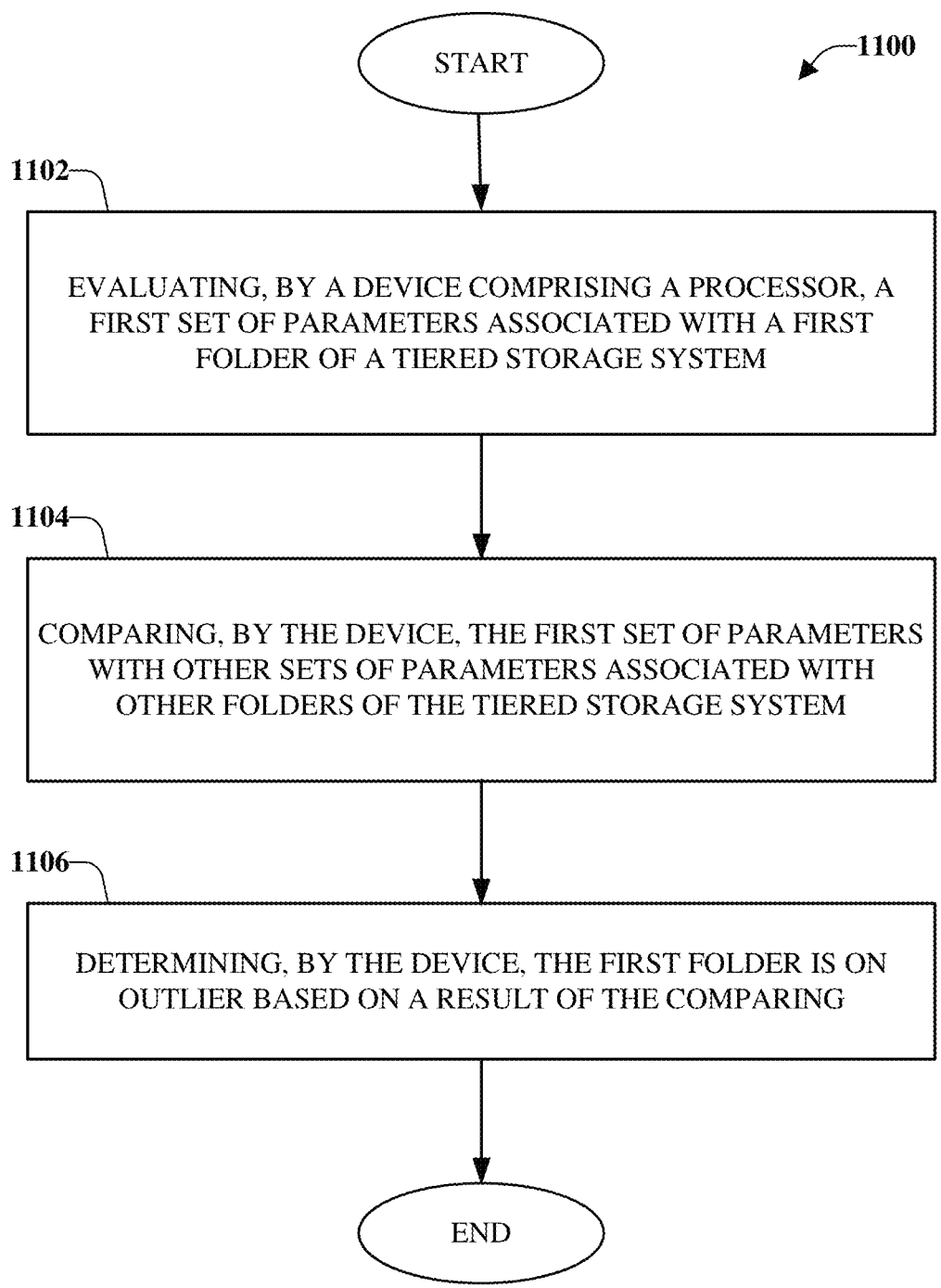
FIG. 11 illustrates a flow diagram of an example, non-limiting, computer-implemented method that identifies outlier folders in a tiered storage system in accordance with one or more embodiments described herein.
Figure 12:
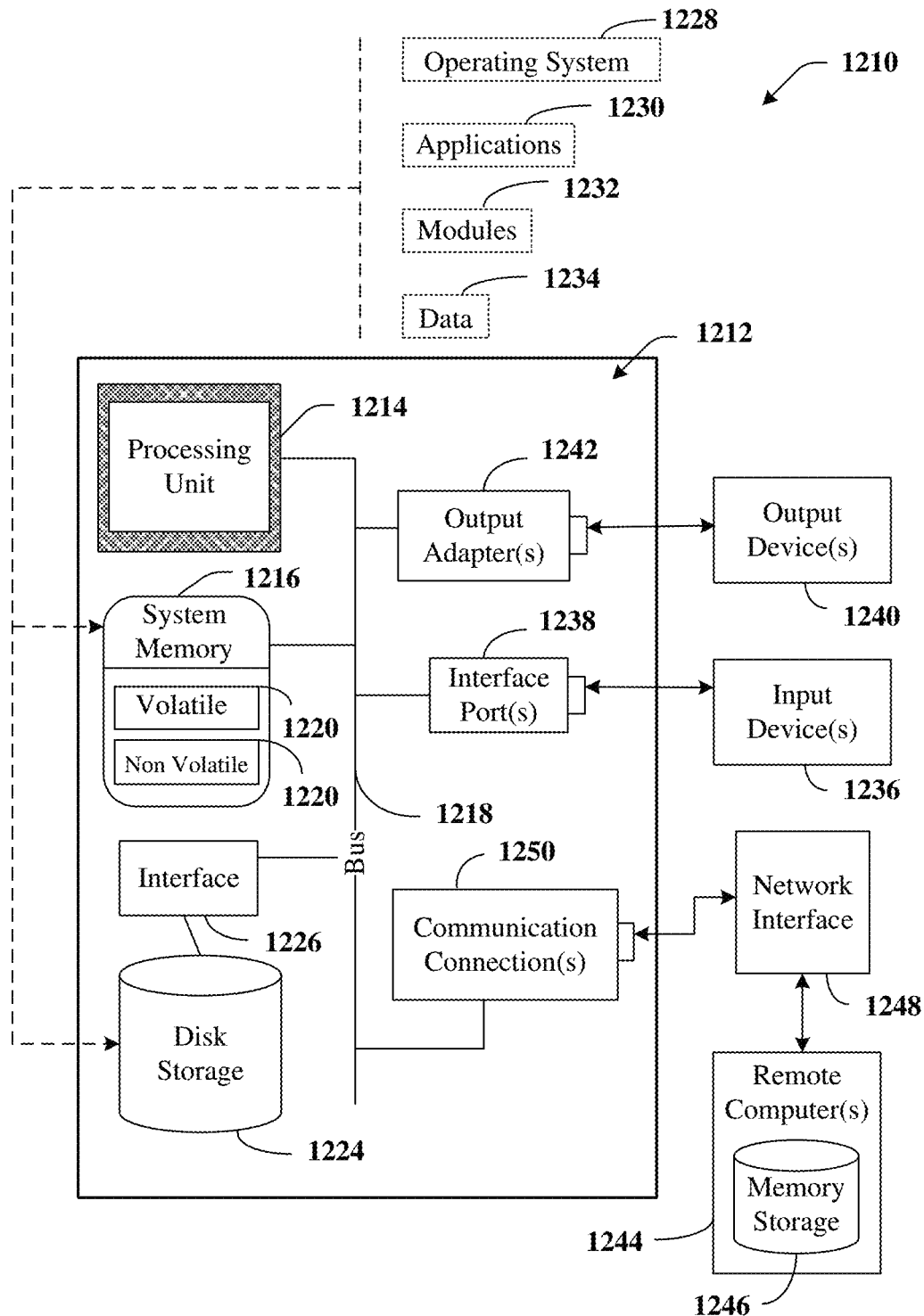
FIG. 12 illustrates an example, non-limiting, computing environment in which one or more embodiments described herein can be facilitated.
Figure 13:
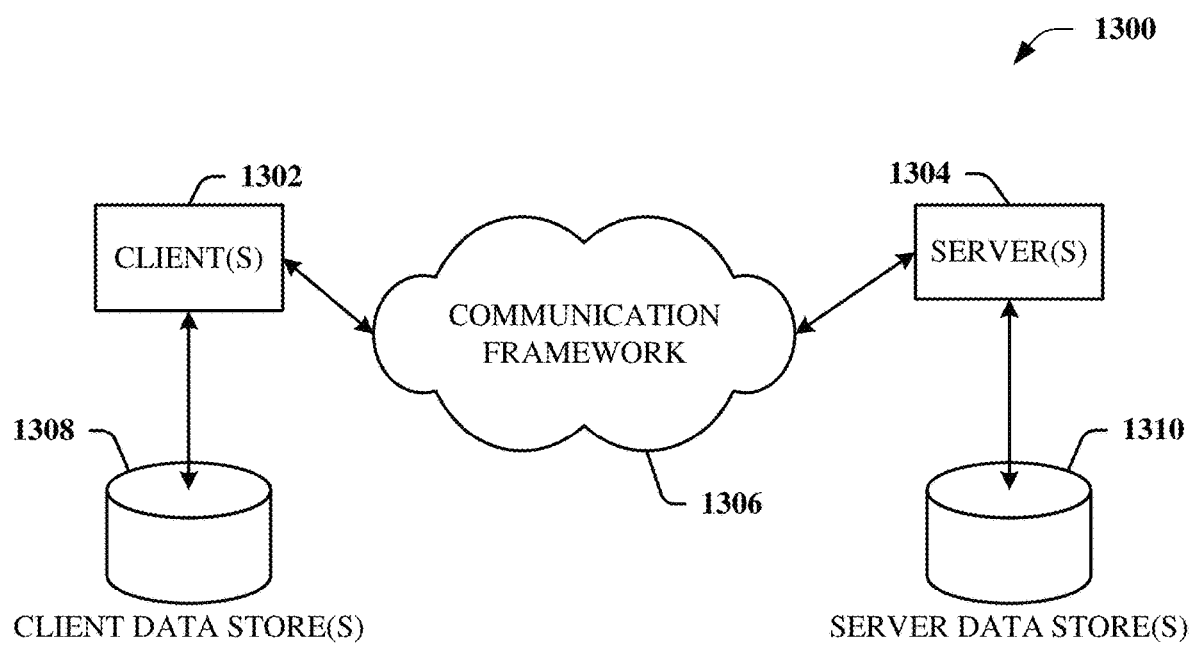
FIG. 13 illustrates an example, non-limiting, networking environment in which one or more embodiments described herein can be facilitated.

FIG. 11 illustrates a flow diagram of an example, non-limiting, computer-implemented method 1100 that identifies outlier folders in a tiered storage system in accordance with one or more embodiments described herein. Repetitive description of like elements employed in other embodiments described herein is omitted for sake of brevity.

In some implementations, a system comprising a processor can perform the computer-implemented method 1100 and/or other methods discussed herein. In other implementations, a device comprising a processor can perform the computer-implemented method 1100 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a device comprising a processor can evaluate a first set of parameters associated with a first folder of a tiered storage system. In an example, the first folder can comprise one or more sub-folders, one or more files, or combinations thereof. Further, evaluating the first set of parameters can comprise determining a size of the first folder as a sum total of the respective sizes of the one or more sub-folders and the one or more files.

According to some implementations, the first folder can comprise at least one or more sub-folders, at least one or more files, or combinations thereof. Further to these implementations, evaluating the first set of parameters can comprise determining a first sum of the respective sizes of the one or more sub-folders and the one or more files that are accessed during a defined period. Further, a size of the first folder can be determined as a second sum of the respective sizes of the one or more sub-folders and the one or more files. In addition, an access percentage can be determined as a ratio between the first sum and the second sum.

In an example, the first folder can comprise one or more files and evaluating the first set of parameters can comprise determining a total cost of the one or more files. Determining the total cost can comprise accessing respective configuration metadata of files of the one or more files. Respective costs of files of the one or more files can be stored in the respective configuration metadata.

The first set of parameters can be compared with other sets of parameters associated with other folders of the tiered storage system, at 1104 of the computer-implemented method 1100. The other folder can be folders other than the first folder. Further, at 1106 of the computer-implemented method 1100, the device can determine that the first folder is on outlier based on a result of the comparison. According to some implementations, determining the first folder is the outlier can comprise determining the first folder is different from the other folders of the tiered storage system based on a result of data cluster analysis.

According to some implementations, the computer-implemented method 1100 can comprise identifying, by the device, the first folder as an outlier. Further, the first folder can be moved to a different tiered storage system. The different tiered storage system can be a storage system different from the original tiered storage system.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s)

1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
evaluating, by a system comprising a processor, a first set of parameters associated with a first folder of a tiered storage system, wherein the first set of parameters comprises an access time that indicates a last time the first folder was accessed and a modification time that indicates when the first folder was last modified;
comparing, by the system, the first set of parameters with other sets of parameters associated with other folders of the tiered storage system other than the first folder, wherein the first set of parameters and the other sets of parameters are similar parameters according to a similarity criterion; and
determining, by the system, that the first folder is an outlier based on a first result of the comparing, wherein the determining that the first folder is the outlier comprises determining that the first folder is different from the other folders of the tiered storage system and causes a performance reduction within the tiered storage system based on a second result of a data cluster analysis, wherein the first folder, as the outlier, comprises a size, an access percentage, and an associated value that are different than respective sizes, respective access percentages, and respective associated values of the other folders of the tiered storage system.

2. The method of claim 1, wherein the first folder comprises at least one of one or more sub-folders, or one or more files, and wherein the evaluating the first set of parameters comprises determining a size of the first folder as a sum total of the respective sizes of the at least one of the one or more sub-folders or the one or more files.

3. The method of claim 1, wherein the first folder comprises at least one of one or more sub-folders, or one or more files, and wherein the evaluating the first set of parameters comprises:
determining a first sum of the respective sizes of the at least one of the one or more sub-folders or the one or more files that are accessed during a defined period;
determining a size of the first folder as a second sum of the respective sizes of the at least one of the one or more sub-folders or the one or more files; and
determining an access percentage as a ratio between the first sum and the second sum.

4. The method of claim 1, wherein the first folder comprises one or more files and wherein the evaluating the first set of parameters comprises determining a total cost of the one or more files.

5. The method of claim 4, wherein the determining the total cost comprises accessing respective configuration metadata of files of the one or more files, and wherein respective costs of the one or more files are stored in the respective configuration metadata.

6. The method of claim 1, further comprising:
moving, by the system, the first folder to a different tiered storage system different from the tiered storage system, wherein the determining that the first folder is the outlier and the moving are performed without receiving user input.

7. A system, comprising:
a processor; and
a memory that stores executable instructions that, when executed by the processor, facilitate performance of operations, comprising:
determining respective parameters associated with objects of a group of objects of a tiered storage system, wherein the respective parameters comprise a size, an access percentage, and a cost;
using the respective parameters associated with the objects of the group of objects as inputs, performing data cluster analysis on the group of objects, resulting in at least one data cluster; and
selecting at least one object from the group of objects as at least one outlier object within the tiered storage system based on the at least one data cluster, wherein the at least one outlier object is selected to reduce a performance capability of the tiered storage system as compared to the objects of the group of objects other than the at least one object, wherein the selecting comprises determining that the at least one object is different from other objects of the tiered storage system based on a result of the data cluster analysis, and wherein the at least one outlier object has a size, an access percentage, and a value that are different than respective sizes, respective access percentages, and respective values of the other objects of the tiered storage system.

8. The system of claim 7, wherein the objects comprise respective collections comprising one or more other objects, one or more items, or combinations thereof.

9. The system of claim 8, wherein the determining the respective parameters comprises determining the respective sizes of the respective collections.

10. The system of claim 8, wherein the determining the respective parameters comprises determining the respective access percentages for the one or more other objects, the one or more items, or combinations thereof of the respective collections.

11. The system of claim 8, wherein the determining the respective parameters comprises determining a sum of the cost of the one or more other objects, the one or more items, or combinations thereof of the respective collections.

12. The system of claim 8, wherein the respective parameters further comprise an access time and a modification time for respective ones of the one or more other objects, the one or more items, or combinations thereof.

13. The system of claim 8, wherein the at least one object and the one or more other objects are folders, wherein the one or more items are files, and wherein the tiered storage system is a tiered file system.

14. The system of claim 7, wherein the respective costs are retrieved from respective configuration files associated with respective objects.

15. The system of claim 7, wherein the selecting the at least one object comprises:
based on the at least one data cluster, identifying the at least one object of the group of objects that is different from the other objects of the group of objects.

16. A system, comprising:
a processor; and
a memory that stores executable instructions that, when executed by the processor, facilitate performance of operations, comprising:
determining first parameters associated with a file in a tiered storage system, wherein the first parameters comprise first information indicative of an access time associated with the file and second information indicative of a modification time associated with the file;
comparing the first parameters with other parameters associated with other files in the tiered storage system, wherein the parameter and the other parameters are similar parameters; and
determining that the file is an outlier based on the comparing indicating the file is different from the other files in the tiered storage system, wherein the determining that the file is the outlier comprises determining that the file is different from the other files of the tiered storage system based on a result of a data cluster analysis, and wherein the outlier is identified as being in an improper tier of the tiered storage system based on the outlier having a level of performance determined to be a lower level of performance as compared to respective levels of performance of the other files in the tiered storage system, and wherein the file that is the outlier comprises a size, an access percentage, and an associated value that are different than respective sizes, respective access percentages, and respective associated values of the other files of the tiered storage system.

17. The system of claim 16, wherein the access time indicates a last time the file was accessed, and wherein the modification time indicates when the file was last modified.

18. The system of claim 16, wherein the determining that the file is the outlier comprises using the result of the data cluster analysis between the file and the other files in the tiered storage system.

19. The system of claim 16, further comprising:
moving the file to a different tiered storage system different from the tiered storage system, wherein the determining that the file is the outlier and the moving are performed without receipt of a manual input from a user.

20. The system of claim 16, wherein the determining that the file is the outlier comprises:
based on the data cluster analysis, identifying the file that is different from the other files in the tiered storage system.

* * * * *